(12) United States Patent
Ogawa et al.

(10) Patent No.: US 7,239,506 B2
(45) Date of Patent: Jul. 3, 2007

(54) DISPLAY DEVICE

(75) Inventors: Masuo Ogawa, Daito (JP); Yuuya Tanaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/439,438

(22) Filed: May 24, 2006

(65) Prior Publication Data

US 2007/0021012 A1    Jan. 25, 2007

(30) Foreign Application Priority Data

May 26, 2005    (JP)    ............... 2005-003691

(51) Int. Cl.
*G06F 1/16*    (2006.01)
(52) U.S. Cl. .................. 361/681; 361/683; 248/917; 248/288.51
(58) Field of Classification Search .......... 361/681
See application file for complete search history.

(56) References Cited

U.S. PATENT DOCUMENTS

| | | | |
|---|---|---|---|
| 5,694,289 A * | 12/1997 | Ema | 361/680 |
| 2004/0165344 A1 * | 8/2004 | Lee | 361/681 |
| 2005/0001114 A1 * | 1/2005 | Ogawa | 248/127 |
| 2006/0168865 A1 * | 8/2006 | Watanabe | 40/745 |

FOREIGN PATENT DOCUMENTS

| | | |
|---|---|---|
| JP | 61-019293 | 1/1986 |
| JP | 63-124278 | 8/1988 |
| JP | 3096746 | 10/2003 |
| JP | 2005-006057 | 1/2005 |

* cited by examiner

*Primary Examiner*—Lisa Lea-Edmonds
*Assistant Examiner*—Anthony Q. Edwards
(74) *Attorney, Agent, or Firm*—Global IP Counselors, LLP (57) ABSTRACT

With a display device in which a main display component is supported in a tilted orientation by a stand unit, the leg of the stand unit will not be pushed in, causing the main display component to readily fall over backwards, even if the main display component in a tilted orientation should be accidentally pushed by hand. A stand unit A has a slider 2 affixed to the upper end of a leg 3, a case 1 that houses the slider 2, and a slider position restriction means 5 for restricting the slider 2 to two positions: an upper position and a lower position. The slider position restriction means 5 is equipped with a cam component 6 and a spring 7. The spring 7 has an engagement component 71, and the cam component 6 is equipped with an upper latching component 61, a lower latching component 62, and a wavy serrated face 65 that links these. The function of increasing the moving resistance when the engagement component 71 moves is imparted to the serrated face 65.

5 Claims, 8 Drawing Sheets

PRIOR ART

FIG.8

PRIOR ART

DISPLAY DEVICE

CROSS-REFERENCE TO RELATED APPLICATIONS

This application claims priority to Japanese Utility Model Application No. 2005-3691. The entire disclosure of Japanese Utility Model Application No. 2005-3691 is hereby incorporated herein by reference.

BACKGROUND OF THE INVENTION

1. Field of the Invention

The present invention relates to a display device. More specifically, the present invention relates to a display device with which a leg extension and retraction function that allows the effective length of the leg of a stand unit to be increased or decreased is imparted to a stand unit for supporting a main display component in a tilted orientation.

2. Background Information

In the past, it has been proposed that a main display component having a forward-facing display screen can be tilted by attaching a stand unit to this main display component. This arrangement allows the effective length of the leg of the stand unit to be adjusted to either of two stages, and allows the leg to be stored on the back of the main display component, and pulled out from the back of the main display component (see Japanese Utility Model Registration 2,096, 746 and Japanese Laid-Open Patent Application 2005-6057, for example). The structure of a stand unit A used in such a conventional display device will be briefly described through reference to FIGS. 7 and 8.

This stand unit A has an attachment base 100 affixed to the back of a main display component (not shown), and a case 1 in the shape of a flat box is pivotably attached to this attachment base 100 via left and right lateral shafts 110. This case 1 is designed to be positioned in one of two positions, a storage position in which it is stowed in a recess 120 of the attachment base 100, and a working position in which it is pulled out diagonally downward from this recess 120, by the action of a positioning mechanism, which does not appear in the drawings. With the stand unit A shown in FIGS. 7 and 8, the flat box-shaped case 1 is formed by screwing a fitted cover (not shown) to a case body 12, using screw holes made in the required places of the case body 12. Accordingly, for the sake of convenience, the number 12 indicating the case body and the number 1 indicating the case are both shown in FIGS. 7 and 8.

The stand unit A has a leg 3, and a slider 2 that is affixed to the upper end of this leg 3 is housed in the case 1 so as to be capable of sliding up and down. The case 1 is equipped with a slider position restriction means 5, and the action of this slider position restriction means 5 restricts the slider 2 to two positions in the case 1, namely, an upper position (see FIG. 7) and a lower position (see FIG. 8). This slider position restriction means 5 is constituted by a cam component 6 in which an upper latching component 61 of an upper end and a lower latching component 62 of a lower end are linked by a flat face 63, and a spring 7 that is a leaf spring equipped with an engagement component 71 that allows the upper latching component 61 and the lower latching component 62 to be selectively latched. The engagement component 71 is formed by the apex of a peaked portion formed in the spring 7. The cam component 6 is provided on the slider 2 side, and the spring 7 is provided on the case 1 side.

Figure 7:
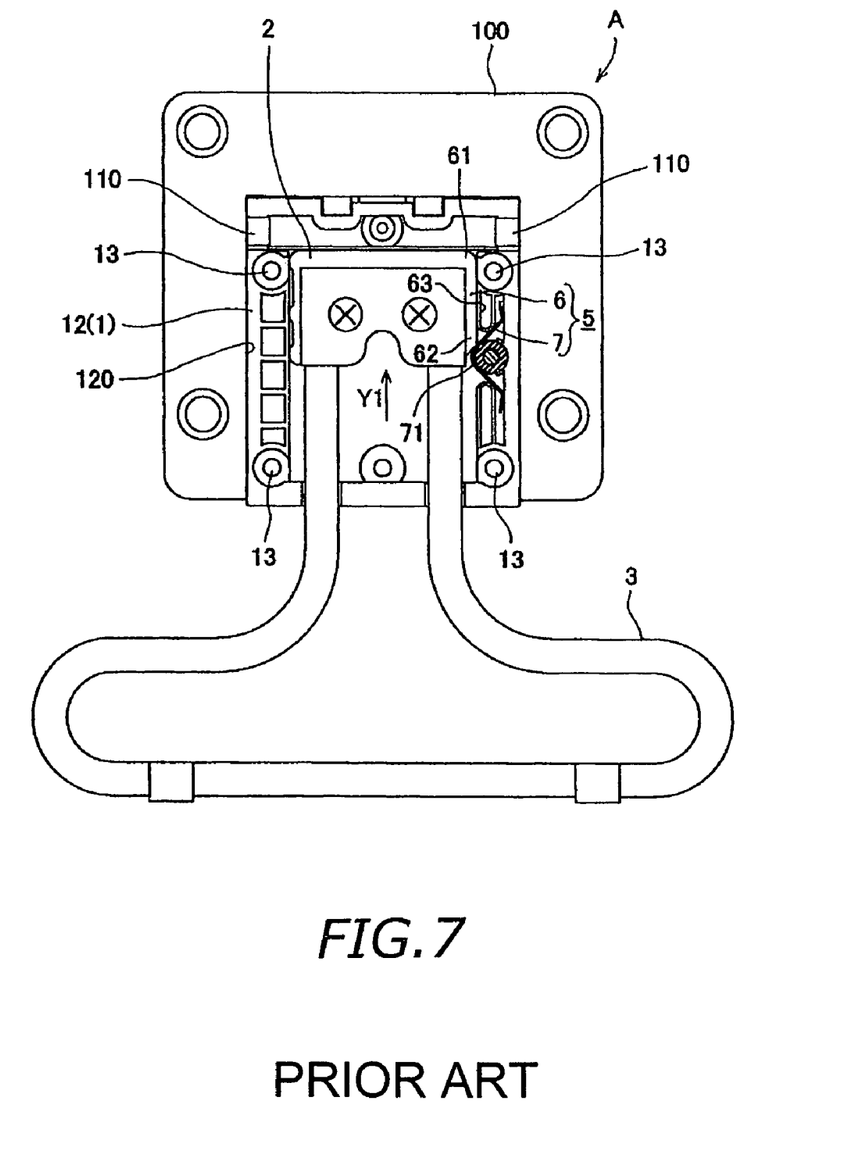
FIG. 7 is a rear view of the internal structure, in the initial state, of the stand unit employed in a conventional display device.

When the slider 2 is moved upward as indicated by the arrow Y1 in FIG. 7, so that the lower latching component 62 of the cam component 6 is latched to the engagement component 71, the protrusion length (that is, the effective length) of the leg 3 from the case 1 is shortened. Therefore, when the case 1 is pushed into its storage position in this state, the overall length portion of the leg 3 is also stored in the back of the main display component (not shown). In contrast, the effective length of the leg 3 from the case 1 is lengthened when the case 1 is pulled out from its storage position to its working position, and the slider 2 is moved downward as indicated by the arrow Y2 in FIG. 8 so that the upper latching component 61 of the cam component 6 is latched to the engagement component 71. In this case, if the leg 3 and the lower end of the main display component (not shown) are set on the floor, etc., the main display component will be supported in a tilted orientation by the leg 3.

It has also been proposed that the tilt angle of a display device can be made variable by providing a display device with a fixed leg and a movable leg, and varying the tilt angle of the movable leg (see Japanese Laid-Open Utility Model Application S61-19293, for example). With the device of Japanese Laid-Open Utility Model Application S61-19293, the tilt angle of the movable leg is made continuously variable by using a gear or a stopper member.

Figure 8:
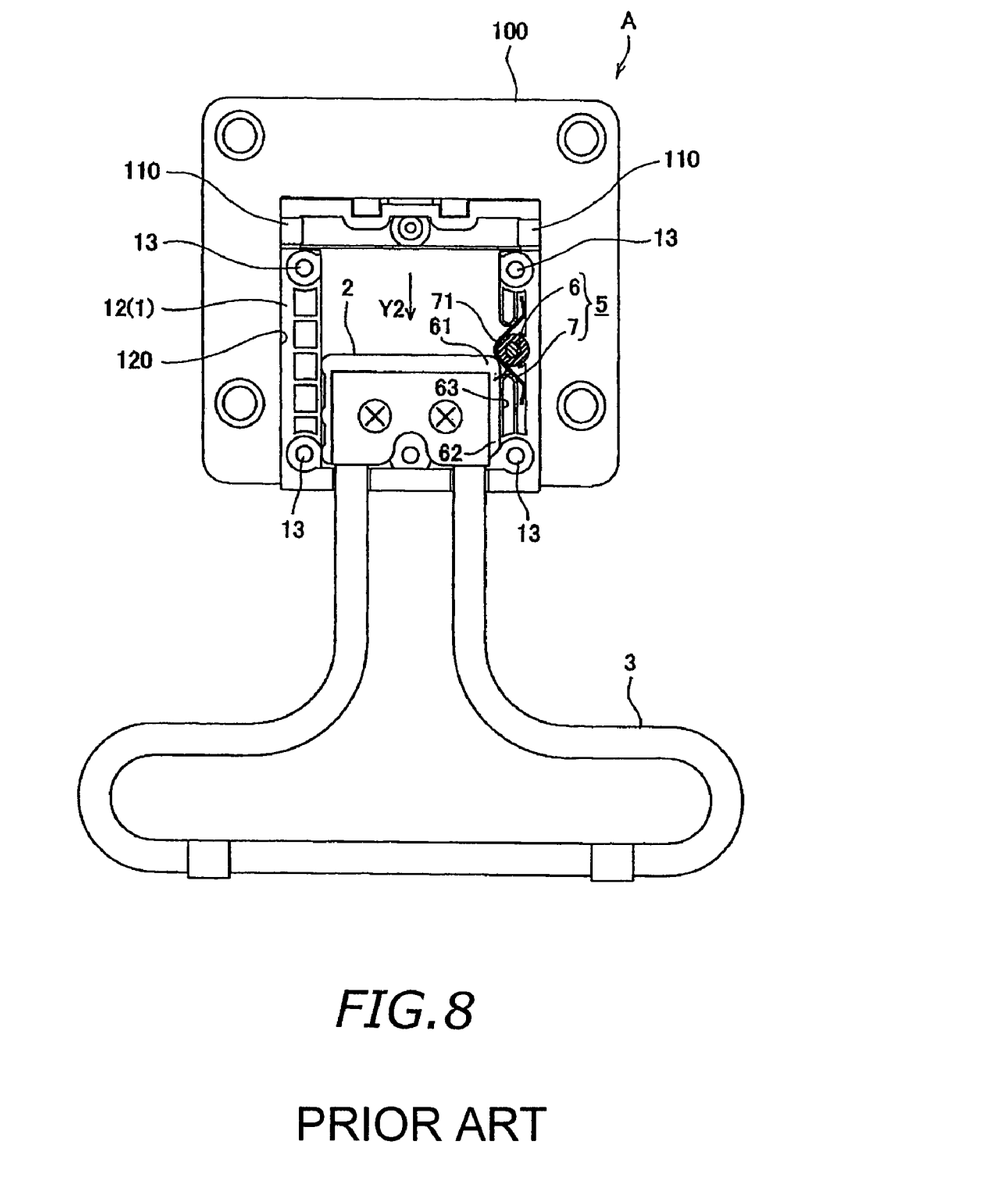
FIG. 8 is a rear view of the internal structure of the same stand unit in another usage state.

With the conventional stand unit A described through reference to FIGS. 7 and 8, when the main display component is supported in a tilted orientation by the leg 3 whose effective length has been increased by moving the slider 2 downward as indicated by the arrow Y2 in FIG. 8, the load produced by the weight of the main display component, etc., is received by the upper latching component 61 of the cam component 6 via the engagement component 71 formed by the apex of the peaked portion of the spring 7. Accordingly, for the main display component to be stably supported by the stand unit A in a tilted orientation, the spring 7 needs to have enough elasticity so that the engagement component 71 will remain latched to the upper latching component 61, and not retract, even if the upper latching component 61 of the cam component 6 is pushed on by the engagement component 71 of the spring 7.

Conversely, when the effective length of the leg 3 is to be increased, the leg 3 is pulled out by hand, the result being that the lower latching component 62 of the cam component 6, which is latched to the engagement component 71 of the spring 7 as shown in FIG. 7, is removed from the engagement component 71, and then the flat face 63 of the cam component 6 is slid over the engagement component 71, and the upper latching component 61 of the cam component 6 is latched to the engagement component 71 as shown in FIG. 8. When the effective length of the leg 3 is to be shortened, the leg 3 is pushed in by hand, the result being that the upper latching component 61 of the cam component 6, which is latched to the engagement component 71 as shown in FIG. 8, is removed from the engagement component 71, and then the flat face 63 of the cam component 6 is slid over the engagement component 71, and the lower latching component 62 of the cam component 6 is latched to the engagement component 71 as shown in FIG. 7. Therefore the spring 7 only needs to have enough elasticity to allow the above operations to be carried out.

Because of this, with a display device that makes use of this stand unit A, the elasticity of the spring 7 must be kept low enough that when the leg 3 is pulled out by hand, the lower latching component 62 of the cam component 6 latching the engagement component 71 can ride up and over while the engagement component 71 of the spring 7 is retracted, and must be kept low enough that when the leg 3 is pushed in by hand, the upper latching component 61 of the cam component 6 latching the engagement component 71 can ride up and over while the engagement component 71 is retracted, but on the other hand, must be kept high enough that the upper latching component 61 of the cam component 6 does not come off from the engagement component 71 of the spring 7 when the main display component is supported in a tilted orientation. Conversely, if the elasticity of the spring 7 is too high, it will be impossible to increase the effective length of the leg 3 when it is pulled out by hand, or to decrease its effective length when it is pushed in by hand.

However, as in these conventional examples, when the elasticity of the spring 7 of the stand unit A is set such that the effective length of the leg 3 can be increased by pulling out the leg 3 by hand, or can be shortened by pushing in the leg 3 by hand, and such that the main display component can be supported in a tilted orientation, if the main display component disposed in a tilted orientation becomes larger and heavier, or if some kind of external pressing force is exerted on a main display component disposed in a tilted orientation, then there is the danger that too high a load will be applied to the engagement component 71 of the spring 7 latched by the upper latching component 61 of the cam component 6 as shown in FIG. 8, and that as a result the engagement component 71 will come off from the upper latching component 61 of the cam component 6.

If this should happen when the main display component is being supported in a tilted orientation by the stand unit A, since the flat face 63 of the cam component 6 will readily slide the engagement component 71 of the spring 7, the leg 3 may be pushed in and its effective length shortened too much, and as a result, the main display component may fall over backwards. More specifically, the leg 3 may be pushed in and the main display component fall over backwards if the main display component should unintentionally be pushed on while the user is viewing the images on the display screen of the main display component that is set up on the floor in a tilted orientation.

In view of the above, it will be apparent to those skilled in the art from this disclosure that there exists a need to provide an improved display device with which measures are taken such that when the elasticity of the spring is set such that the effective length of the leg can be lengthened or shortened by hand and the main display component can be supported in a tilted orientation, there will be no problem of the upper latching component of the cam component coming off from the engagement component of the spring, and the cam component sliding until the leg is pushed all the way in to its storage length, and with which even without changing the elasticity of the spring, it is possible to prevent the problem of a main display component in a tilted orientation collapsing to the rear in the event that the main display component should be large and heavy, or that some kind of external pressing force is exerted on the main display component.

There exists another need to provide an improved display device with which the above-mentioned object can be achieved without modifying the elasticity of the spring, and merely by changing the shape of the cam component, without increasing the number of parts required.

There exists yet another need to provide an improved display device with which measures are taken that allow the elasticity of the spring to be increased or decreased, the result of which is that the action of preventing the upper latching component of the cam component from coming off the engagement component of the spring, and the leg from being pushed in, can be suitably manifested according to the weight of the main display component and other such factors.

This invention addresses these needs in the art as well as other needs, which will become apparent to those skilled in the art from this disclosure.

SUMMARY OF THE INVENTION

The display device pertaining to the present invention is a display device comprising a main display component and a stand unit. The main display component have a forward-facing display screen. The stand unit is attached to the main display component and have an extendable leg for supporting the main display component in a tilted orientation, a slider affixed to the upper end of the leg, a case in which the slider is housed so as to be capable of sliding up and down, and slider position restriction means interposed between the slider and the case, for restricting the slider to two positions consisting of an upper position and a lower position within the case, thereby allowing the leg to be extended from the case in two protrusion lengths. The slider position restriction means include a cam component provided on one side of the slider and the case and having an upper latching component for an upper end and a lower latching component for a lower end, an engagement component provided on the other side end and allowing the upper latching component and the lower latching component to be selectively latched, and a spring for constantly elastically biasing the engagement component toward the cam component. The cam component being equipped with a wavy serrated face that links the upper latching component and the lower latching component and increases the moving resistance when there is relative movement of the engagement component between the two latching components.

With this constitution, when the main display component is being supported in a tilted orientation by the leg, even if too great a load should be applied to the engagement component of the spring latched by the upper latching component of the cam component, so that the upper latching component of the cam component comes off from the engagement component, since a state is created in which the wavy serrated face linked to the upper latching component of the cam component is hooked to the engagement component that is biased by the spring, there is increased moving resistance when the engagement component slides over this serrated face. As a result, it is unlikely that a situation will occur in which the leg is pushed back in by the sliding of the engagement component over this serrated face. Therefore, if the main display component is larger and heavier, or if some kind of external pressing force is exerted on the main display component, the rearward collapse of the main display component caused by the leg being pushed in and its effective length being shortened can be prevented.

It is possible with the present invention to employ a constitution in which a leg length adjusting function of restricting the protrusion length of the leg from the case to one or more stages by latching and positioning the engagement component is imparted to the serrated face. This allows the effective length of the leg to be adjusted to multiple stages by engaging the engagement component with the serrated face. Accordingly, an advantage is that the tilt angle of a display that is supported by the leg in a tilted orientation can be adjusted over multiple stages.

With the present invention, the spring is preferably a leaf spring having a peaked portion whose apex forms the engagement component, and a pair of seats that extend from the ends of the peaked portion and are supported so as to be displaced up and down by deformation of the peaked portion accompanying the lateral extension and retraction of the engagement component. Employing this constitution allows the shape and structure of the spring to be simplified, and allows the cost of producing the spring to be kept low.

The present invention preferably has elasticity adjustment means for adjusting the pressing force on the peaked portion of the spring and thereby increasing or decreasing the elasticity of the spring. This allows the biasing force exerted on the engagement component by the elasticity adjustment means to be varied without changing the spring itself to one that has a different spring constant, so a good balance can be struck between the amount of operating force required when pushing in or pulling out the leg by hand, and the biasing force exerted on the engagement component, according to the weight of the main display component and other such factors.

The display device pertaining to the present invention comprises a main display component and a stand unit. The main display component have a forward-facing display screen. The stand unit is attached to the main display component and have an extendable leg for supporting the main display component in a tilted orientation, a slider affixed to the upper end of the leg, a case in which the slider is housed so as to be capable of sliding up and down, and slider position restriction means interposed between the slider and the case, for restricting the slider to two positions consisting of an upper position and a lower position within the case, thereby allowing the leg to be extended from the case in two protrusion lengths. The slider position restriction means include a cam component provided on the slider side and having an upper latching component for an upper end and a lower latching component for a lower end, an engagement component provided on the case side and allowing the upper latching component and the lower latching component to be selectively latched, and a spring for constantly elastically biasing the engagement component toward the cam component. The spring is a leaf spring having a peaked portion whose apex forms the engagement component, and a pair of seats that extend from the ends of the peaked portion, are supported by a support face provided to the case, and are displaced up and down at the support face by deformation of the peaked portion accompanying the lateral extension and retraction of the engagement component. The cam component is equipped with a wavy serrated face that links the upper latching component and the lower latching component and increases the moving resistance when there is relative movement of the engagement component between the two latching components. The serrated face is imparted with a leg length adjustment function for restricting the protrusion length of the leg from the case to one or more stages by latching and positioning the engagement component. There is provided elasticity adjustment means for adjusting the pressing force on the peaked portion of the spring and thereby increasing or decreasing the elasticity of the spring. The operation of the present invention will be described later with reference to the preferred embodiments.

With the present invention, when the elasticity of the spring is set low enough that the leg can be extended or retracted and its effective length thereby lengthened or shortened by hand, and furthermore is set high enough to allow the main display component to be supported in a tilted orientation, the cam component will not slide over the engagement component, causing the leg to be pushed in, even if some kind of external pressing force should be exerted that would cause the upper latching component to come off from the engagement component, which is accomplished merely by providing a wavy serrated face to the cam component and thereby linking the lower latching component and upper latching component. Accordingly, the problem of the leg supporting the main display component in a tilted orientation being unintentionally pushed in so that the main display component falls over backwards is prevented without greatly modifying the structure of the stand unit described through reference to FIGS. 7 and 8, and furthermore without adding any new parts. Therefore, even if the main display component should be unintentionally pushed by hand while the user is viewing the images on the display screen of the main display component, the main display component will not fall over backwards, and a stand unit for supporting a lighter main display component can be used without modification to support a larger and heavier main display component, which allows parts to be shared and boosts the productivity of the display devices.

Also, there is a provided an elasticity adjustment means for increasing or decreasing the elasticity of the spring, and merely by increasing or decreasing the biasing force of the spring on the engagement component, it is possible to strike a suitable balance between the amount of operating force required for extending or retracting the effective length of the leg, and the biasing force of the spring required to support the main display component so that it will not fall over. As a result, the stand unit is more versatile, and even though the main display component will not fall over backwards, the operation of extending or retracting the leg can be carried out with ease.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be described with reference to the drawings. It will be apparent to those skilled in the art from this disclosure that the following descriptions of the embodiments of the present invention are provided for illustration only, and not for the purpose of limiting the invention as defined by the appended claims and their equivalents.

Figure 1:
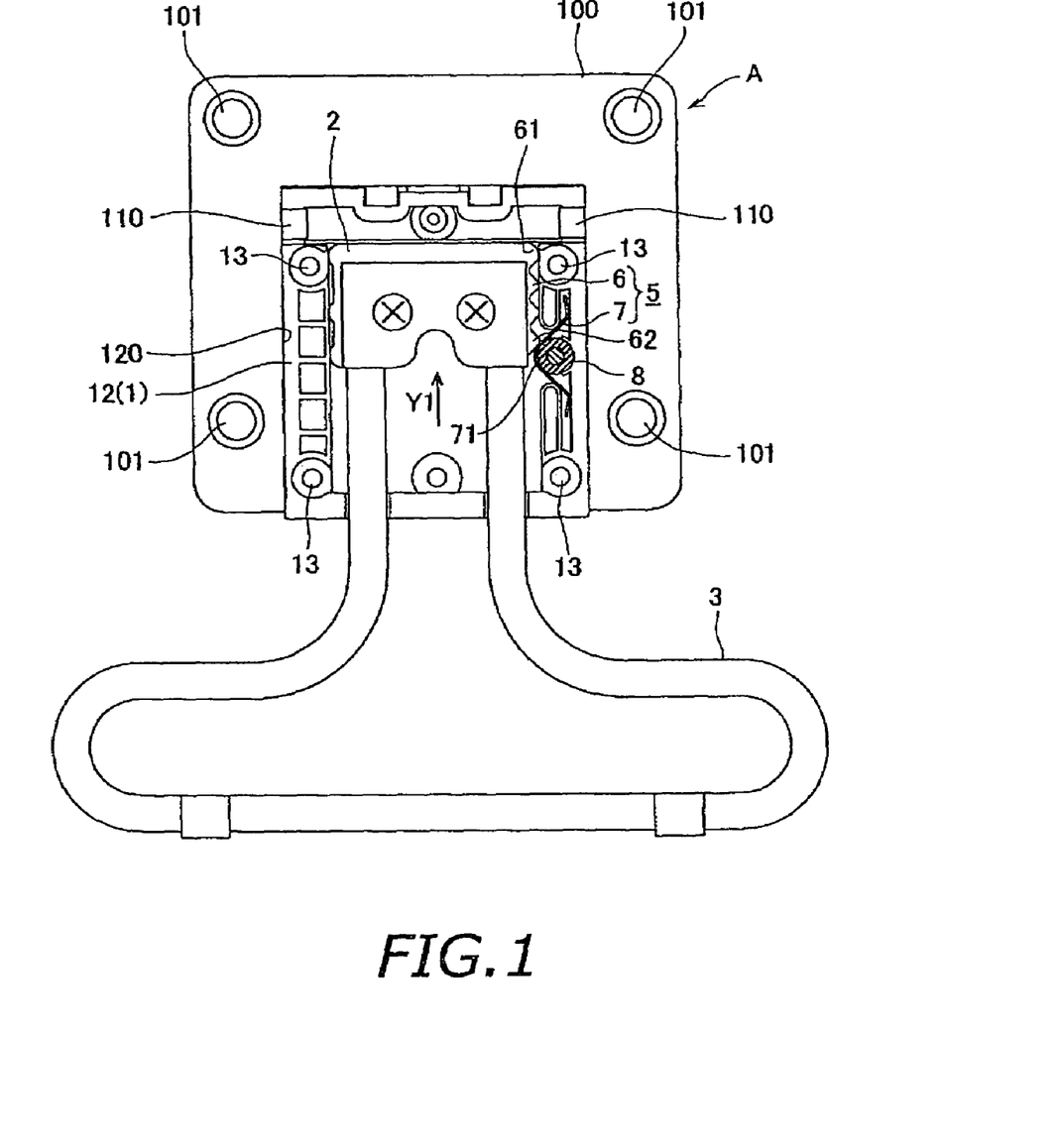
FIG. 1 is a rear view of the internal structure, in the initial state, of the stand unit employed in the display device pertaining to an embodiment of the present invention.
Figure 2:
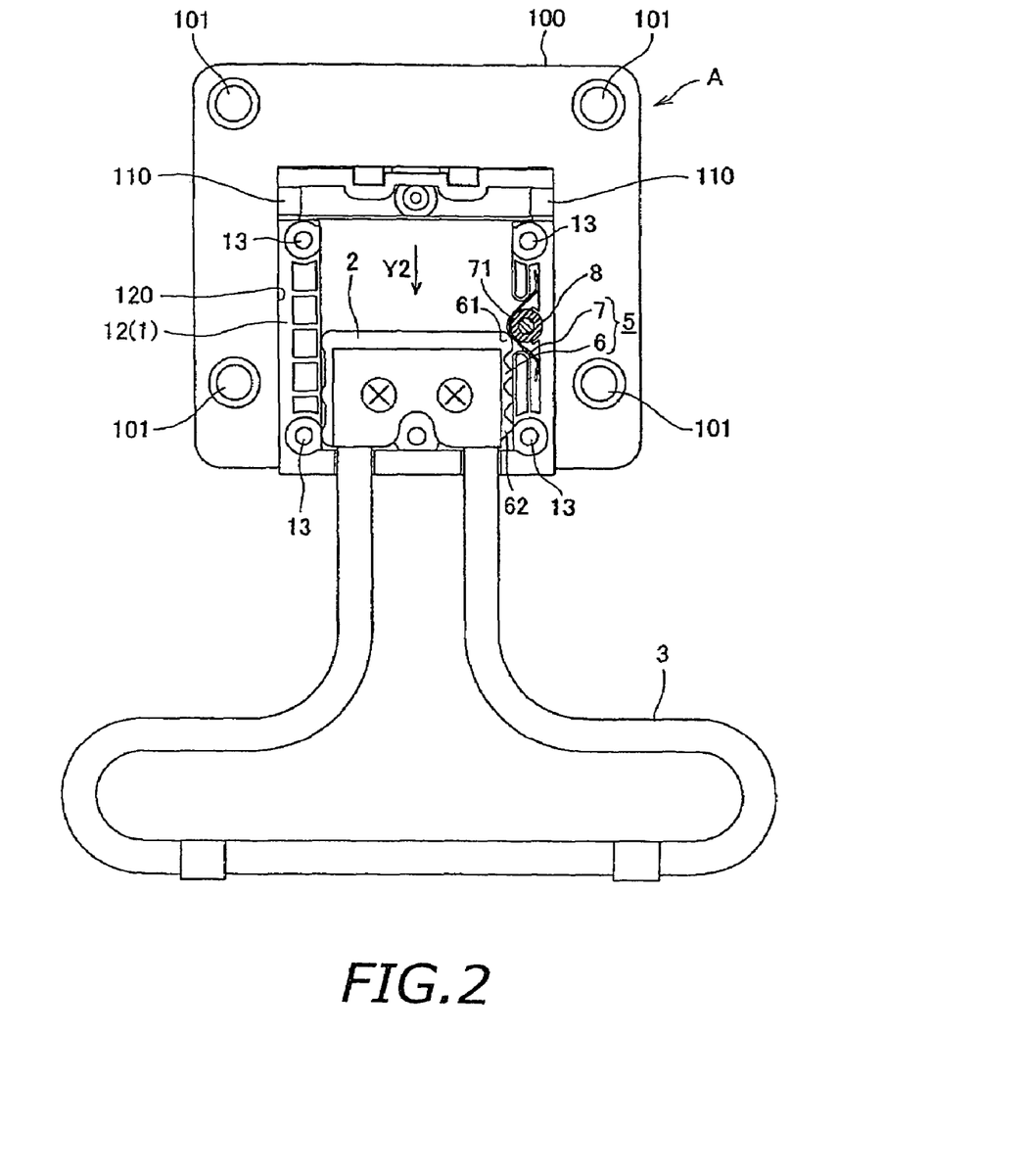
FIG. 2 is a rear view of the internal structure of the same stand unit in another state.
Figure 3:
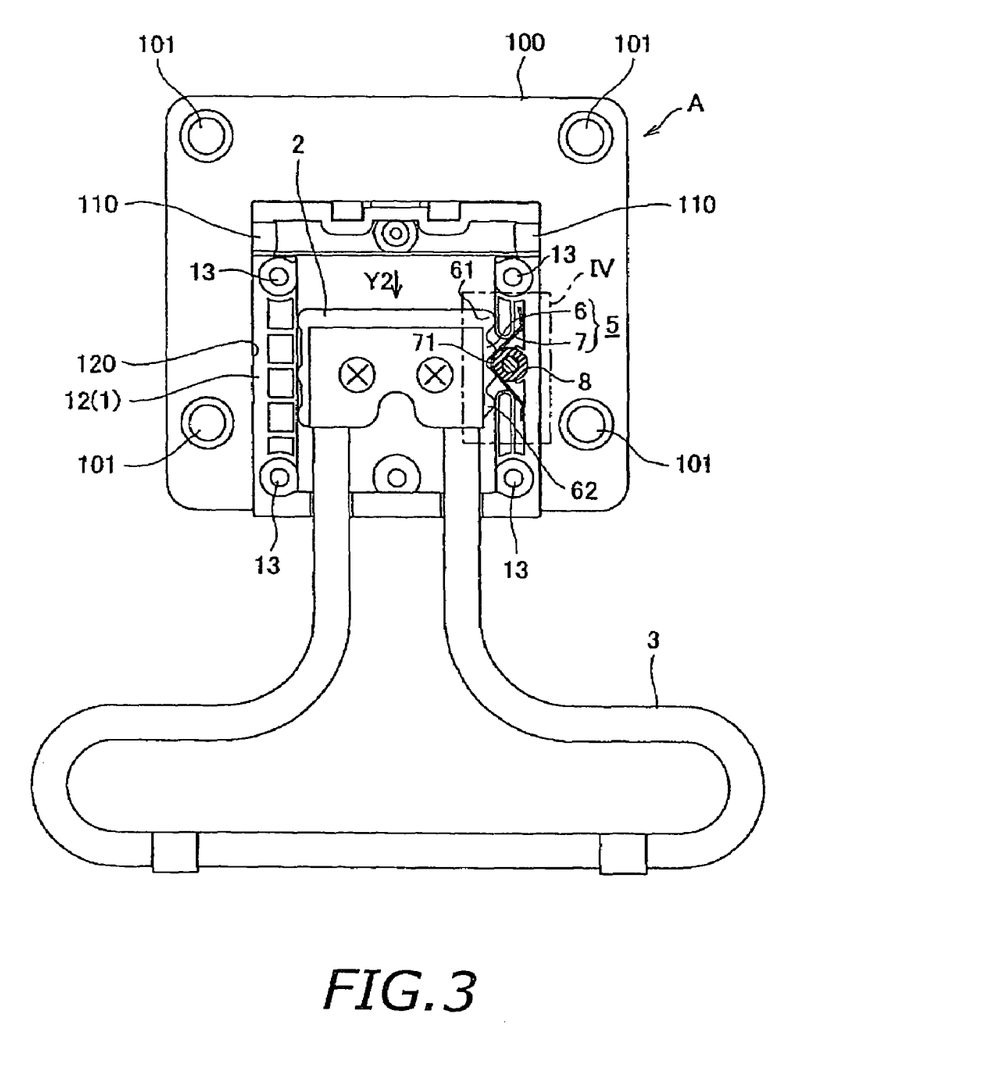
FIG. 3 is a rear view of the internal structure of the stand unit in yet another state.
Figure 4:
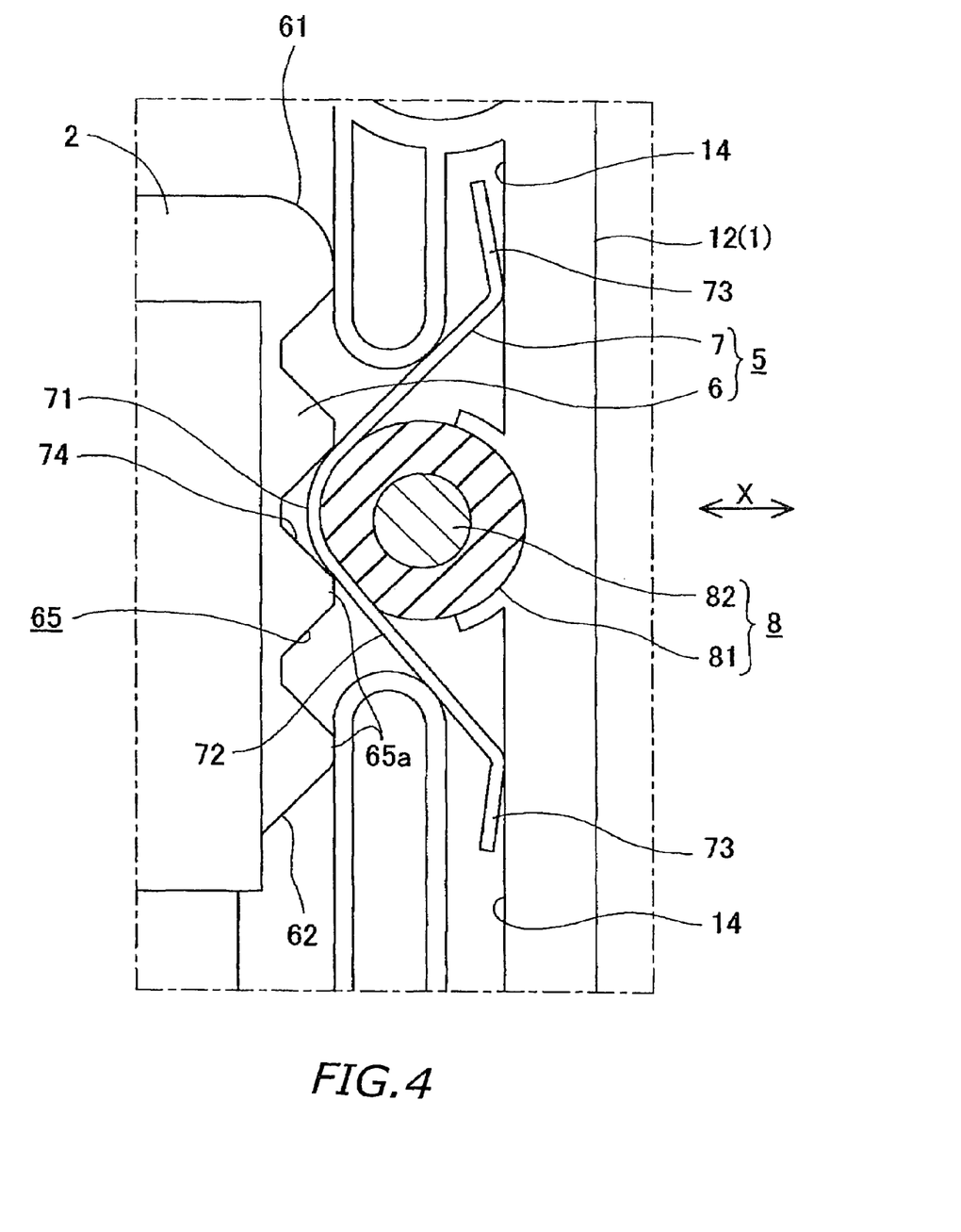
FIG. 4 is a detail view of section IV in FIG. 3.
Figure 5:
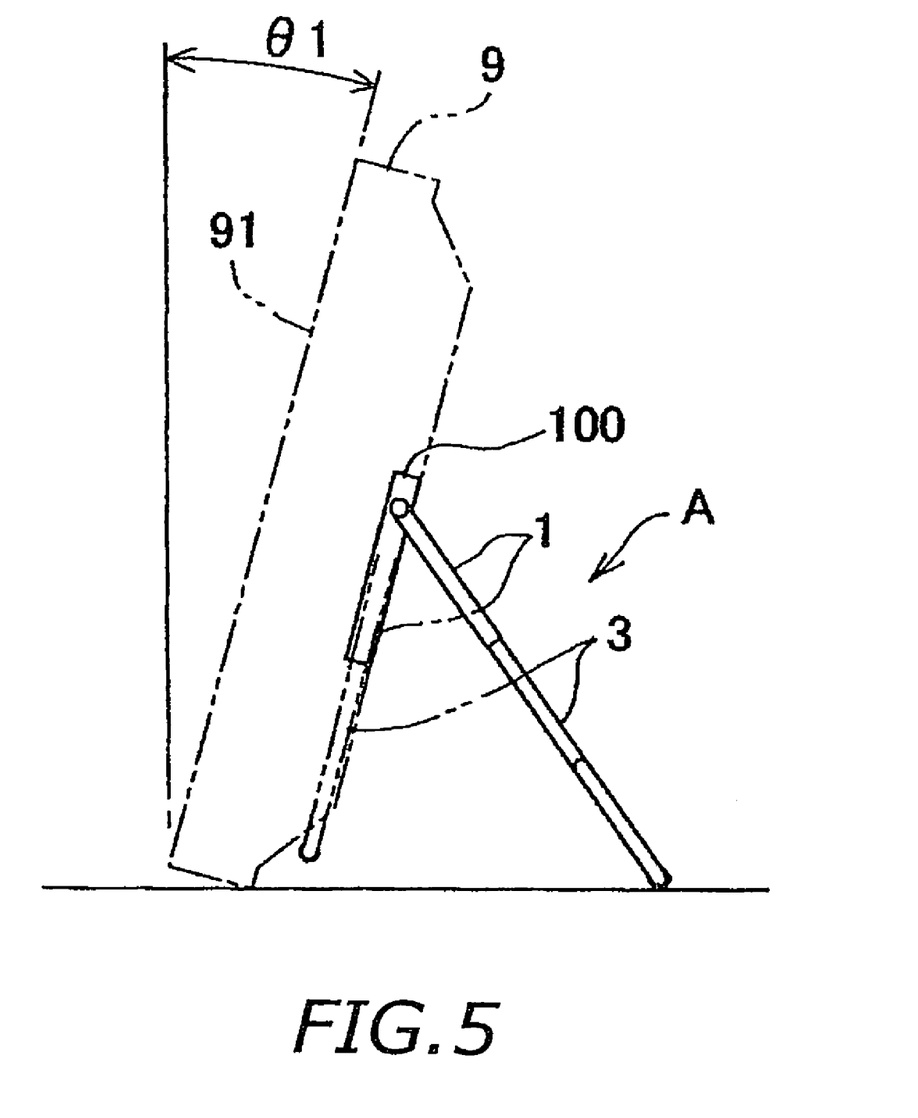
FIG. 5 is a diagram illustrating an example of a usage state.
Figure 6:
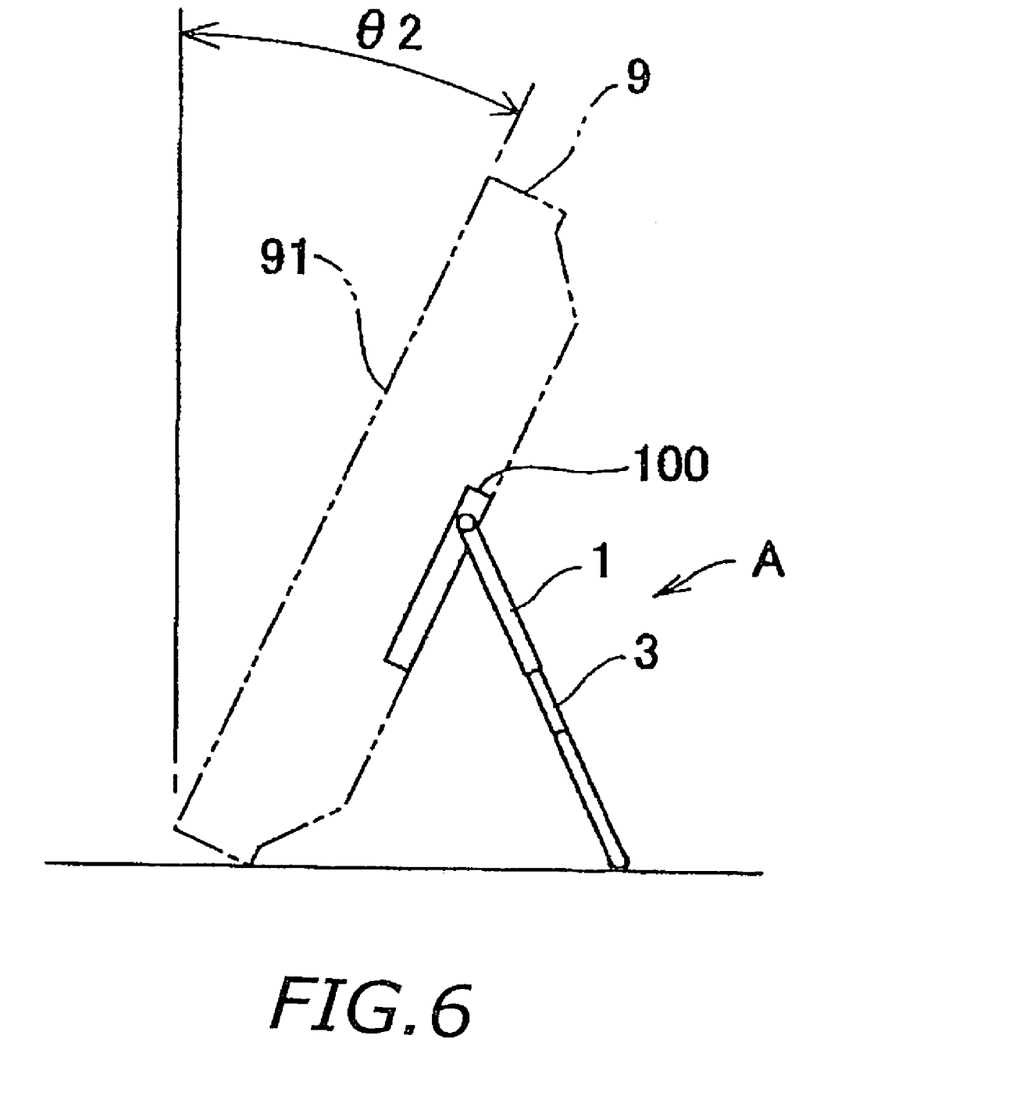
FIG. 6 is a diagram illustrating an example of another usage state.

FIG. 1 is a rear view of the internal structure, in the initial state, of the stand unit A employed in the display device pertaining to an embodiment of the present invention. FIG. 2 is a rear view of the internal structure of the same stand unit A in another state. FIG. 3 is a rear view of the internal structure in yet another state. FIG. 4 is a detail view of section IV in FIG. 3. FIG. 5 is a diagram illustrating an example of a usage state. FIG. 6 is a diagram illustrating an example of another usage state.

The stand unit A shown in FIGS. 1 to 3 has a rectangular attachment base 100 having attachment screw insertion holes 101 in its four corners, and is affixed to a main display component 9 (see FIG. 5 or 6) by threading and tightening attachment screws (not shown), which pass through these attachment screw insertion holes 101, in the screw holes in the rear face of the main display component 9 (see FIG. 5 or 6).

Lateral shafts 110 are provided concentrically at two locations (left and right) on the base 100. The upper end of a case 1, which is in the shape of a flat box, are pivotably attached to these lateral shafts 110, and this case 1 is designed to be positioned in one of two positions, a storage position in which it is stowed in a recess 120 of the attachment base 100, and a working position in which it is pulled out diagonally downward from this recess 120, by the action of a positioning mechanism, which does not appear in the drawings. In FIGS. 1 to 3, the flat box-shaped case 1 is formed by screwing a fitted cover (not shown) to a case body 12, using screw holes made in the required places of the case body 12. Accordingly, for the sake of convenience, the number 12 indicating the case body and the number 1 indicating the case are both shown in FIGS. 1 to 3.

The slider 2, which is substantially rectangular, is screwed to the upper end of the leg 3 of the stand unit A, and the slider 2 is housed in the case 1 so as to be capable of sliding up and down, whereas the case 1 is equipped with a slider position restriction means 5, and the action of this slider position restriction means 5 restricts the slider 2 to two positions in the case 1, namely, the upper position shown in FIG. 1 and the lower position shown in FIG. 2. As shown in detail view in FIG. 4, this slider position restriction means 5 is constituted by a cam component 6 in which an upper latching component 61 of an upper end and a lower latching component 62 of a lower end are linked by a wavy serrated face 65, and a spring 7 that is a leaf spring equipped with an engagement component 71 that allows the upper latching component 61 and the lower latching component 62 to be selectively latched. The engagement component 71 is formed by the apex of a V-shaped peaked portion 72 formed in the spring 7. The cam component 6 is formed integrally on one side of the slider 2 side, and the spring 7 is provided on the case 1 side. The spring 7 is a leaf spring having a pair of seats 73 that extend from the ends of the peaked portion 72, are supported by support faces 14 provided to the case body 12 of the case 1, and are displaced up and down at these support faces 14 by deformation of the peaked portion 72 accompanying the lateral (arrow X) extension and retraction of the engagement component 71.

With the above constitution, when the slider 2 is moved upward as indicated by the arrow Y1 in FIG. 1, so that the lower latching component 62 of the cam component 6 is latched to the engagement component 71, the leg 3 is retracted and the protrusion length (that is, the effective length) of the leg 3 is shortened. Therefore, when the case 1 is pushed into its storage position in this state, the overall length portion of the leg 3 is also stored in the back of the main display component 9 (see FIG. 5 or 6). In contrast, the effective length of the leg 3 from the case 1 is lengthened when the case 1 is pulled out from its storage position to its working position, and the slider 2 is moved downward as indicated by the arrow Y2 in FIG. 2 so that the upper latching component 61 of the cam component 6 is latched to the engagement component 71. In this case, if the leg 3 and the lower end of the main display component 9 (see FIG. 5 or 6) are set on the floor, etc., the main display component (see FIG. 5 or 6) will be supported in a tilted orientation by the leg 3.

In this embodiment, the upper latching component 61 and the lower latching component 62 of the cam component 6 are linked by the wavy serrated face 65, and the function of increasing the moving resistance when the engagement component 71 moves is imparted to this serrated face 65. Specifically, if the upper latching component 61 and the lower latching component 62 of the cam component 6 are linked by the wavy serrated face 65, then when the serrated face 65, which is in contact with the engagement component 71, slides over the engagement component 71, the serrated face 65 hooks onto the engagement component 71 while the peak portions 65a of the serrated face 65 ride up and over the engagement component 71, so the force required to ride over the engagement component 71 becomes moving resistance and makes the serrated face 65 less prone to movement. Accordingly, if the load applied to the engagement component 71 of the spring 7 latched by the upper latching component 61 of the cam component 6 should for some reason become too large (as in FIG. 2) while the main display component 9 is being supported in a tilted orientation by the leg 3 as shown in FIG. 5 to 6, so that the upper latching component 61 retracts the engagement component 71 and comes off from the engagement component 71, a state is created in which the wavy serrated face 65 linked to the upper latching component 61 of the cam component 6 is hooked to the engagement component 71 that is biased by the spring 7, the result being that the moving resistance of the serrated face 65 increases, one of the peak portions 65a of the serrated face 65 engages with the engagement component 71, and the upward movement of the slider 2 stops at that position. An investigation into this situation revealed that when a user accidentally pushes on the main display component 9, the user usually will immediately remove his or her hand from the main display component 9 at the point when the peak portion 65a that is adjacent to the upper latching component 61 latches the engagement component 71, and the upward movement of the slider 2 therefore stops at that point. Accordingly, there is no problem of the slider 2 moving all the way to the position shown in FIG. 1 and the leg 3 being pushed in until its effective length becomes the length during storage, nor does a situation occur in which the main display component 9 falls over backward. Also, since the tilted angle of the main display component 9 does not change very much, the user can keep right on enjoying the images on the display screen 91.

The force required for the peak portions 65a of the serrated face 65 to ride up and over the engagement component 71 is smaller than the force required for the upper latching component 61 for the lower latching component 62 to ride up and over the engagement component 71. Specifically, the constitution is such that the latching width of the peak portions 65a of the serrated face 65 to the engagement component 71 is smaller than the latching width of the upper latching component 61 or the lower latching component 62 to the engagement component 71. Accordingly, when the leg 3 is pushed in and its effective length is shortened to the length during storage, from a state in which the upper latching component 61 of the cam component 6 is latched to the engagement component 71 as shown in FIG. 2, if the leg 3 is pushed in with enough force for the upper latching component 61 to ride up and over the engagement component 71, in most cases the entire serrated face 65 will ride up and over the engagement component 71 by the momentum produced here, so the effective length of the leg 3 can be easily shortened to the length during storage. Similarly, when the effective length of the leg 3 is increased to the working length by pulling out the leg 3 from a state in which the upper latching component 61 of the cam component 6 is latching the engagement component 71, if the leg 3 is pulled out with enough force for the upper latching component 61 to ride up and over the engagement component 71, in most cases the entire serrated face 65 will ride up and over the engagement component 71 by the momentum produced here, so the effective length of the leg 3 can be easily increased to the working length.

Therefore, with a display device that employs the above-mentioned stand unit A, merely by changing the flat face 63 of the cam component 6 described through reference to FIGS. 7 and 8 to the above-mentioned serrated face 65, the problem of the leg 3 being pushed in and the main display component 9 falling over backwards when an external force is accidentally applied to the main display component 9 that has been disposed in a tilted orientation either does not occur at all, or is unlikely to occur. Nevertheless, the operating force required to push in or pull out the leg 3 is kept to about the same as that of the stand unit A described through reference to FIGS. 7 and 8, so there is no decrease in the versatility of the stand unit A.

With this embodiment, when one of the peak portions 65a that form the serrated face 65 of the cam component 6 is latched to the engagement component 71 formed by the apex of the peaked portion 72 of the spring 7, the weight of the main display component 9 in a tilted orientation (see FIG. 5 or 6) is received by the engagement component 71, and the tilted orientation of the main display component 9 is maintained. Put another way, a leg length adjustment function for restricting the effective length of the leg 3 to multiple stages is imparted to the serrated face 65. Accordingly, it is possible to adjust the force required when the leg 3 is pulled out, and keep the effective length of the leg 3 long or short. Therefore, if this is taken advantage of, then, for example, the effective length of the leg 3 can be kept long and the tilt angle θ1 of the main display component 9 reduced as shown in FIG. 5, which brings the forward-facing display screen 91 of the main display component 9 closer to vertical, or the effective length of the leg 3 can be kept short and the tilt angle θ2 of the main display component 9 increased as shown in FIG. 6, which brings the forward-facing display screen 91 of the main display component 9 closer to its maximum tilt angle. The phrase "maximum tilt angle" here is the tilt angle of the main display component when the leg 3 has been pulled out as far as it will go and the upper latching component 61 of the cam component 6 is latched to the engagement component 71 as shown in FIG. 2.

Also, with this embodiment, as shown in FIG. 4 and elsewhere, an elasticity adjustment means 8 is provided to the back of the peaked portion 72 of the spring 7. This elasticity adjustment means 8 is equipped with a cylindrical elastic body 81 made of rubber and provided to the back part of the peaked portion 72. An adjusting screw 82 that is passed through this elastic body 81 is threaded into a screw hole provided to the cover of the case 1. This adjusting screw 82 is designed so that it can be rotationally operated in either the tightening or the loosening direction from outside the case. If this adjusting screw 82 is provided, then when the adjusting screw 82 is tightened so that its head presses the elastic body 81 in the axial direction, the outer peripheral surface of the elastic body 81 will expand outward radially, and will press the peaked portion 72 of the spring 7 on the cam component 6 side. Conversely, when the adjusting screw 82 is turned in the loosening direction so as to allow the elastic body 81 to extend axially, the outer peripheral surface of the elastic body 81 will contract inward radially, and the pressing force on the peaked portion 72 of the spring 7 will decrease. Therefore, the result of increasing or decreasing how much the adjusting screw 82 is tightened, and thereby increasing or decreasing how much the outer peripheral surface of the elastic body 81 expands, is that the pressing force of the elastic body 81 on the peaked portion 72 of the spring 7 is increased or decreased, by which the amount of force needed to retract the engagement component 71 is adjusted. Utilizing this function makes it possible to strike a good balance between the amount of operating force required for extending or retracting the effective length of the leg 3, and the biasing force of the spring 7 required to support the main display component 9 so that it will not fall over. As a result, the stand unit is more versatile, and even though the main display component 9 will not fall over backwards, the operation of extending or retracting the leg can be carried out with ease.

With this embodiment, the cam component 6 of the stand unit A is provided on the slider 2 side, and the spring 7 is provided on the case 1 side, but the cam component may instead be provided on the case side, and the spring on the slider side. Also, the serrated face 65 of the cam component 6 here is configured to have a plurality of peak portions 65a, but the serrated face 65 may instead be formed so that it has one peak portion and one valley portion.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is clamed is:

1. A display device comprising:
   a main display component having a forward-facing display screen; and
   a stand unit being attached to the main display component and having an extendable leg for supporting the main display component in a tilted orientation, a slider affixed to the upper end of the leg, a case in which the slider is housed so as to be capable of sliding up and down, and slider position restriction means interposed between the slider and the case, for restricting the slider to two positions consisting of an upper position and a lower position within the case, thereby allowing the leg to be extended from the case in two protrusion lengths;
   wherein the slider position restriction means including a cam component provided on the slider side and having an upper latching component for an upper end and a lower latching component for a lower end, an engagement component provided on the case side and allowing the upper latching component and the lower latching component to be selectively latched, and a spring for constantly elastically biasing the engagement component toward the cam component;
   the spring being a leaf spring having a peaked portion whose apex forms the engagement component, and a pair of seats that extend from the ends of the peaked portion, are supported by a support face provided to the case, and are displaced up and down at the support face by deformation of the peaked portion accompanying the lateral extension and retraction of the engagement component; and
   the cam component being equipped with a wavy serrated face that links the upper latching component and the lower latching component and increases the moving resistance when there is relative movement of the engagement component between the two latching components, the serrated face being imparted with a leg length adjustment function for restricting the protrusion length of the leg from the case to one or more stages by latching and positioning the engagement component, and there being provided elasticity adjustment means for adjusting the pressing force on the peaked portion of the spring and thereby increasing or decreasing the elasticity of the spring.

2. A display device comprising:
   a main display component having a forward-facing display screen; and
   a stand unit having an extendable leg for supporting the main display component in a tilted orientation, a slider affixed to the upper end of the leg, a case in which the slider is housed so as to be capable of sliding up and down, and slider position restriction means interposed between the slider and the case, for restricting the slider to two positions consisting of an upper position and a lower position within the case, thereby allowing the leg to be extended from the case in two protrusion lengths;
   wherein the slider position restriction means including a cam component provided on one side of the slider and the case and having an upper latching component for an upper end and a lower latching component for a lower end, an engagement component provided on the other side and allowing the upper latching component and the lower latching component to be selectively latched, and a spring for constantly elastically biasing the engagement component toward the cam component; and
   the cam component being equipped with a wavy serrated face that links the upper latching component and the lower latching component and increases the moving resistance when there is relative movement of the engagement component between the two latching components.

3. The display device according to claim 2, wherein a leg length adjustment function for restricting the protrusion length of the leg from the case to one or more stages by latching and positioning the engagement component is imparted to the serrated face.

4. The display device according to claim 3, wherein the spring is a leaf spring having a peaked portion whose apex forms the engagement component, and a pair of seats that extend from the ends of the peaked portion and are supported so as to be displaced up and down by deformation of the peaked portion accompanying the lateral extension and retraction of the engagement component.

5. The display device according to claim 4, having elasticity adjustment means for adjusting the pressing force on the peaked portion of the spring and thereby increasing or decreasing the elasticity of the spring.

* * * * *